(12) United States Patent
Taguchi et al.

(10) Patent No.: US 9,208,609 B2
(45) Date of Patent: Dec. 8, 2015

(54) METHOD FOR FITTING PRIMITIVE SHAPES TO 3D POINT CLOUDS USING DISTANCE FIELDS

(71) Applicant: Mitsubishi Electric Research Laboratories, Inc., Cambridge, MA (US)

(72) Inventors: Yuichi Taguchi, Arlington, MA (US); Srikumar Ramalingam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 338 days.

(21) Appl. No.: 13/932,493

(22) Filed: Jul. 1, 2013

(65) Prior Publication Data

US 2015/0006126 A1 Jan. 1, 2015

(51) Int. Cl.
G06T 15/00 (2011.01)
G06T 17/00 (2006.01)
G06K 9/00 (2006.01)
G06K 9/62 (2006.01)

(52) U.S. Cl.
CPC ............ G06T 17/00 (2013.01); G06K 9/00214 (2013.01); G06K 9/6211 (2013.01)

(58) Field of Classification Search
CPC ......... G06T 17/00; G06T 17/05; G06T 17/10; G06T 2200/08; G06T 15/00; G06T 15/08; G06T 15/30; G01S 7/4818; G01S 7/4817; G01S 17/89; G01B 11/24; G01B 11/002; G01C 11/00; G01C 15/002
See application file for complete search history.

(56) References Cited

U.S. PATENT DOCUMENTS

| | | | |
|---|---|---|---|
| 5,988,862 A * | 11/1999 | Kacyra et al. | 703/6 |
| 6,236,403 B1 * | 5/2001 | Chaki et al. | 345/420 |
| 6,330,523 B1 * | 12/2001 | Kacyra et al. | 702/159 |
| 7,002,570 B2 * | 2/2006 | Perry et al. | 345/419 |
| 7,098,909 B2 * | 8/2006 | Hayano et al. | 345/420 |
| 7,995,055 B1 * | 8/2011 | Ma et al. | 345/420 |
| 8,010,328 B2 * | 8/2011 | Frisken et al. | 703/6 |
| 8,050,491 B2 * | 11/2011 | Vaidyanathan | 382/154 |
| 8,265,909 B2 * | 9/2012 | Frisken et al. | 703/1 |
| 8,456,471 B2 * | 6/2013 | Wallace | 345/427 |

(Continued)

FOREIGN PATENT DOCUMENTS

EP 2385496 A1 9/2011

OTHER PUBLICATIONS

Zhou Ren, Junsong Yuan, Chunyuan Li and Wenyu Liu Minimum Near-Convex Decomposition for Robust Shape Representation In Proc. of Intl. Conf. on Computer Vision (ICCV), pp. 303-310, Barcelona, Spain, Nov. 2011.*

(Continued)

*Primary Examiner* — Devona Faulk
*Assistant Examiner* — Charles L Beard
(74) *Attorney, Agent, or Firm* — Dirk Brinkman; Gene Vinokur

(57) ABSTRACT

A method fits primitive shapes to a set of three-dimensional (3D) points by first converting the set of 3D points to a distance field. Each element in the distance field is associated with a distance to a nearest point in the set of 3D points. A set of two or more candidates are hypothesizing from the primitive shapes, and a score is determined for each candidate using the distance field. Then, the primitive shape to fit to the 3D points is selected from the candidates according to their scores.

10 Claims, 1 Drawing Sheet

(56) References Cited

U.S. PATENT DOCUMENTS

| | | | |
|---|---|---|---|
| 8,483,858 B2* | 7/2013 | Sullivan et al. | 700/97 |
| 8,838,419 B2* | 9/2014 | Sullivan et al. | 703/1 |
| 8,994,790 B2* | 3/2015 | Ganapathi et al. | 348/46 |
| 2003/0215877 A1* | 11/2003 | Love et al. | 435/7.1 |
| 2004/0041805 A1* | 3/2004 | Hayano et al. | 345/419 |
| 2004/0051711 A1* | 3/2004 | Dimsdale et al. | 345/419 |
| 2008/0106547 A1* | 5/2008 | Kataoka et al. | 345/420 |
| 2010/0034440 A1* | 2/2010 | Zhan et al. | 382/128 |
| 2010/0053163 A1* | 3/2010 | Wallace | 345/427 |
| 2010/0085357 A1* | 4/2010 | Sullivan et al. | 345/420 |
| 2010/0166294 A1* | 7/2010 | Marrion et al. | 382/154 |
| 2010/0215255 A1* | 8/2010 | Xiao et al. | 382/159 |
| 2010/0332196 A1 | 12/2010 | Fisker | |
| 2011/0026793 A1* | 2/2011 | Goel et al. | 382/131 |
| 2011/0196661 A1* | 8/2011 | Spicola et al. | 703/11 |
| 2011/0245954 A1* | 10/2011 | Sullivan et al. | 700/104 |
| 2011/0304619 A1* | 12/2011 | Fu et al. | 345/420 |
| 2011/0304628 A1* | 12/2011 | Fu et al. | 345/441 |
| 2013/0124148 A1* | 5/2013 | Jin et al. | 703/1 |
| 2013/0321418 A1* | 12/2013 | Kirk | 345/423 |
| 2014/0132604 A1* | 5/2014 | Bao et al. | 345/420 |

OTHER PUBLICATIONS

Schnabel et al. "Efficient RANSAC for point-cloud shape detection," Computer Graphics forum, Wiley-Blackwell Pblishing LTD, GB. vol. 26, No. 2, Jun. 1, 2007. p. 214-226, XP009150551.

Li et al. "Globfit," ACM Siggraph 2011 Papers on. Siggraph '11, Jan. 1, 2011, p. 1. XP05514026, New York, NY, USA.

Shen et al. "Structure recovery by part assembly," ACM Transactions on Graphics, vol. 31, No. 6. Nov. 1, 2012, p. 1. XP055140217.

Ruwen Schnabel, Roland Wahl, and Reinhard Klein. Efficient RANSAC for Point-Cloud Shape Detection. Computer Graphics Forum, 26:2(214-226), Jun. 2007.

Pedro F. Felzenszwalb and Daniel P. Huttenlocher. Distance Transforms of Sampled Functions. Cornell Computing and Information Science TR2004-1963.

\* cited by examiner

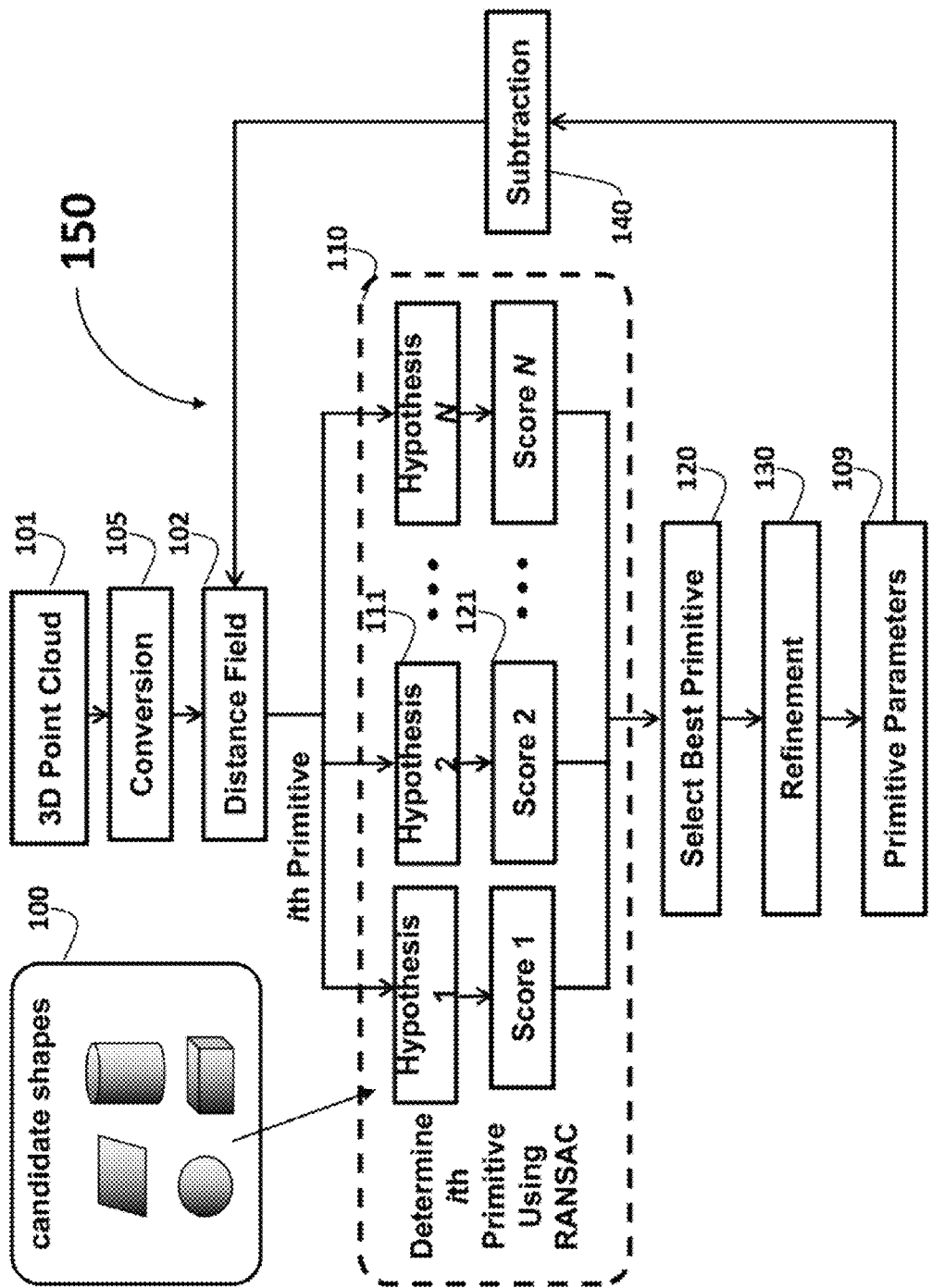

METHOD FOR FITTING PRIMITIVE SHAPES TO 3D POINT CLOUDS USING DISTANCE FIELDS

FIELD OF THE INVENTION

This invention relates generally processing three-dimensional (3D) data, and more particularly to fitting primitive shapes to 3D data.

BACKGROUND OF THE INVENTION

Three-dimensional (3D) sensors based on structured light, laser scanning, or time of flight are used in many applications in robotics, computer vision, and computer graphics. The sensors scan a 3D scene as a set of 3D points, commonly referred to as a 3D point cloud. 3D point clouds for large scale scenes can be obtained by registering several scans acquired by the 3D sensors into a single coordinate system.

Storing and processing 3D point clouds require substantial memories and computational resources because each 3D point has to be stored and processed separately. Representing 3D point clouds as a set of primitive shapes is desired for compact modeling and fast processing.

One method fits primitive shapes to 3D point clouds using a random sample consensus (RANSAC) framework. That method hypothesizes several primitive, shapes and selects the best primitive shape according to scores of the hypothesized primitive shapes. That method uses raw 3D point clouds for determining the scores, which requires, for each hypothesized primitive shape, traversing all the points in the 3D point cloud or searching nearby points in the 3D point cloud given a reference point on the hypothesized primitive shape. This is time consuming.

SUMMARY OF THE INVENTION

The embodiments of the invention provide a method for fitting primitive shapes to 3D point clouds. The method represents the 3D point cloud by a distance field. A RANSAC framework efficiently performs the primitive shape fitting.

The distance field represents the distance from each point in a 3D space to a nearest object surface, which makes the score evaluation in the RANSAC framework efficient. The distance field also provides gradient directions for each point to the nearest object surface, which helps a refinement process based on gradient decent.

Thus, in contrast to the prior art, the use of the distance field representation allows for fast score computation for generated hypotheses in the RANSAC framework, and efficient refinement of hypothesized shape parameters.

BRIEF DESCRIPTION OF THE DRAWING

FIG. 1 is a flow diagram of a method for fitting primitive shapes to 3D point clouds using distance fields according to the embodiments of the invention.

DETAILED DESCRIPTION OF THE PREFERRED EMBODIMENTS

As shown in FIG. 1, the embodiments of the invention provide a method for fitting primitive shapes to 3D point clouds using distance fields. Input to the method is a 3D point cloud 101. The 3D point cloud can be obtained as a scan of a 3D sensor, or by registering multiple scans of the 3D sensor or scans from several different 3D sensors.

The 3D point cloud is converted 105 to a distance field 102. The distance field is used in a RANSAC-based primitive shape fitting process 110, where a set of two or more candidate shapes 100 are hypothesized 111 by using a minimal number of points required to determine parameters of a corresponding shape. A score 121 is determined for each shape candidate.

The method selects 120 the best candidate primitive shape that has a minimal score among the candidates. Optionally, the parameters of the best primitive shape can be refined 130 using a gradient-decent procedure. To determine a set of primitive shapes in a point cloud, we iterate the process 110 after subtracting 140 the selected primitive shape from the distance field. The output of the method is a set of parameters 109 that define the set of primitive shapes.

The method can be performed in a processor 150 connected to memory and input/output interfaces as known in the art.

Conversion from Point Cloud to Distance Field

Let $P=\{p_i\}$, for $i=1, \ldots, N$, be a set of points of the 3D point cloud. We convert the point cloud to a distance field $D(x)$, where x represents an element in the distance field. The element can be a 3D voxel in a regular cuboid grid having the volume $V=W \times H \times L$, where W, H, and L are width, height and length of the grid. Associated with an element or voxel is a distance to a nearest point in the set of 3D points.

Let R be a 3×3 rotation matrix, t be a 3×1 translation vector, and s be a scale factor to transform the coordinate system of the point cloud to the coordinate system of the distance field. Then, the $i^{th}$ 3D point $p_i$ in the point cloud is transformed to the coordinate system of the distance field as $q_i=s(Rp_i+t)$. We determine R, t, and s such that all $q_i$ are within the distance field of W×H×L voxels.

The transformed points $q_i$ are discretized to the nearest grid point of the distance field as $q_i^d=\mathrm{round}(q_i)$, where the function round(·) determines the nearest grid point of the 3D point in the argument. Let $Q=\{q_i^d\}$ be the set of discretized points. The distance field of the point cloud is determined by solving the following minimization problem:

$$D(x) = \min_{y \in Q}(d(x, y) + T(y)), \quad (1)$$

where the function d determines a distance between the points x and y, and T is an indicator function $$T(y) = \begin{cases} 0 & \text{if } y \in Q \\ \infty & \text{otherwise} \end{cases}. \quad (2)$$

A naïve solution to the minimization problem of Equation (1) requires $O(V^2)$ time. Procedures to determine the distance field in $O(V)$ time are known for several distance functions d, such as Manhattan, Euclidean, and $L_1$ distances. Such procedures perform one-dimensional distance field computation sequentially for each dimension. Our preferred embodiment uses the Euclidean distance as the distance function.

After determining the distance field by solving Equation (1), we truncate the distance field as $$D(x) = \begin{cases} D(x) & \text{if } D(x) < C \\ C & \text{otherwise} \end{cases}, \quad (3)$$

where C is a threshold used for the truncation. This make the primitive fitting process accurate even when there are missing data.

Then, we determine a gradient vector field of D(x) which can be used to hypothesize the normal vector of a 3D point, as well as to determine the Jacobian matrix for the gradient-decent-based refinement process. We use the following equations to determine the gradient vector field:

$$\nabla D(x) = \begin{pmatrix} D(x) - D(x-(1,0,0)^T) \\ D(x) - D(x-(0,1,0)^T) \\ D(x) - D(x(0,0,1)^T) \end{pmatrix}, \quad (4)$$

and $$\overline{\nabla D}(x) = \frac{\nabla D(x)}{\|\nabla D(x)\|}. \quad (5)$$

To efficiently hypothesize primitive shapes, we store a set of voxels Z having zero distance, i.e., $Z=\{x_i|D(x_i)=0\}$. The voxels correspond to points on object surfaces, which we use to efficiently hypothesize primitive shapes.

The above preferred embodiment uses uniform-size elements or voxels. Note that adaptive-size voxels, such as octree-based representation can also be used.

Primitive Shape Fitting Using Distance Field

Given the distance field and the gradient vector field, we use the RANSAC framework for primitive shape fitting. We hypothesize a set of two or more candidate primitive shapes, determine their scores, and select the best candidate with the minimal score. In the preferred embodiments, we use infinite planes segments, spheres, cylinders, and cuboids as the primitive shapes. However, the number of different primitive shapes can be unbounded.

For each primitive, we use a minimum number of voxels required to generate a shape hypothesis. We select such voxels from the set Z. Note that each voxel has a position $r_i \in Z$ and a normal $n_i = \overline{\nabla D}(r_i)$ Thus, each voxel can be considered an oriented 3D point, i.e., 3D point having a 3D direction vector. Below, we describe the procedure for generating shape hypotheses for each primitive shape in the set 100.

Infinite Plane Primitives

An infinite plane, i.e., a plane without boundary, can be hypothesized by sampling a single oriented point $(r_1, n_1)$ All points r on this plane should satisfy the following plane equation:

$$n_1^T(r-r_1)=0 \quad (6)$$

To determine the score v for this plane, we sample several points $r_j$ (j=1, ..., J) within the volume of the distance field that satisfy $$|n_1^T(r-r_1)| < \epsilon, \quad (7)$$

where $\epsilon$ is a small threshold value, which allows small deviations of sampled points from the plane equation (6). We then average the distances of the sampled points as $$v = \frac{1}{J}\sum_{j=1}^{J} D(r_j). \quad (8)$$

Hereafter, we denote a small threshold value as $\epsilon$, which allows small deviations from exact values due to noise and discretization such as in Equation (7). Note that $\epsilon$ can be different for different equations.

Plane Segment Primitives

A plane segment primitive is represented by its plane equation and a set of points that are the members of the plane segment. First, we determine the plane equation by sampling a single oriented point $(r_1, n_1)$ as in the infinite plane primitives. Then, we define a set of points on this plane connected from the sampled point position $r_1$. Specifically, we find neighboring points $r_m$ from $r_1$ that satisfy Equation (7) and $D(r_m) < \epsilon$. We maintain a set of points $r_m$ (m=1, ..., M) as the member of the plane segment hypothesis. To determine the score for the hypothesis, we sample several points $r_j$ from $r_m$ and average the distances of the sampled points as in Equation (8).

Sphere Primitives

A sphere can be hypothesized by sampling two oriented points $(r_1, n_1)$ and $(r_2, n_2)$. For the two points to lie on a sphere, the line passing through $r_1$ and having the direction $n_1$ should intersect with the line passing through $r_2$ and having the direction $n_2$ at a point c, which corresponds to the center of the sphere. The intersection point is obtained by finding the point that is closest to both of the lines. In addition to this constraint, we have to ensure that $$|\|c-r_1\|-\|c-r_2\|| < \epsilon, \quad (9)$$

such that the points $r_1$ and $r_2$ are located at the same distance from the center of the sphere c. We use these constraints to remove false samples of the two oriented points: If the two lines do not intersect, or Equation (9) is not satisfied, then we discard the sampled points and restart the sampling process from the first point.

We determine the average distance from c to $r_1$ and $r_2$ as the radius of the sphere r, i.e., $$r=(\|c-r_1\|+\|c-r_2\|)/2 \quad (10)$$

All points r that lie on the sphere should satisfy\

$$|\|c-r\|-r| < \epsilon \quad (11)$$

The score for the sphere is determined by sampling several points on this sphere satisfying Equation (11) and averaging the distances of the sampled points using Equation (8).

Cylinder Primitives

For hypothesizing a cylinder, we first sample two oriented points $(r_1, n_1)$ and $(r_2, n_2)$ that define the axis and radius of the cylinder. The direction of the axis is defined as $n_a = n_1 \times n_2$, where × denotes the cross product. We project the two oriented points $(r_1, n_1)$ and $(r_2, n_2)$ along the direction of the axis $n_a$ onto a common plane, and determine the intersection of two lines on the plane, defined by the two oriented points projected onto the plane. The two projected points should be approximately the same distance from the intersection point so that we can determine the radius of the cylinder using the average distance between the intersection and the projected two points. If this condition is not satisfied, then we discard the sampled points and restart the sampling process from the first point.

Next we sample other two oriented points $(r_3, n_3)$ and $(r_4, n_4)$ to define the two planar surfaces of the cylinder. The two points should satisfy a condition that $n_3$ and $n_4$ are parallel to the direction of the axis $n_a$, i.e., $$1-|n_a^T n_3| < \epsilon$$

and $$1-|n_a^T n_4| < \epsilon \quad (12)$$

If this condition is not satisfied, then we discard the sampled points and restart the sampling process from the first point.

To determine the score of the cylinder, we sample several points on the surface of the cylinder, and average the distances of the sampled points as in Equation (8).

Cuboid Primitives

A cuboid can be hypothesized by sampling six oriented points. We sample the first two points $(r_1,n_1)$ and $(r_2,n_2)$ such that the normals $n_1$ and $n_2$ are parallel to each other, i.e., $$1-|n_1^T n_2|<\epsilon \qquad (13)$$

We sample the next points $(r_3,n_3)$ and $(r_4,n_4)$ such that $n_3$ is perpendicular to $n_1$ and $n_4$ is parallel to $n_3$ i.e., $$|n_1^T n_3|<\epsilon$$

and $$1-|n_3^T n_4|<\epsilon \qquad (14)$$

We sample the last two points such that $(r_5,n_5)$ and $(r_6,n_6)$ such that $n_5$ is perpendicular to both $n_1$ and $n_3$, and $n_6$ is parallel to $n_5$, i.e., $$|n_1^T n_5|<\epsilon,$$

$$|n_3^T n_5|<\epsilon,$$

and $$1-|n_5^T n_6|<\epsilon \qquad (15)$$

If any of the above conditions are not satisfied while sampling the six points, then we discard the sampled points and start the sampling process from the first point again.

Each of the six points defines a face of a cuboid. To determine the score, we sample a set of points on the six faces and average the distance values of the sampled points as in Equation (8).

Best Primitive Selection

For each iteration of our method, we hypothesize several primitive shapes and determine their corresponding scores as described above. Then, we select the best primitive that has the minimal score among all the hypotheses.

This naïve scoring method prefers a primitive shape with a small surface area. To avoid selecting such a small primitive shape, we use a score weighted by the surface area of the primitive shape for the best primitive selection. Specifically, we use $v/S^p$ as the weighted score, where S denotes the surface area of the primitive, and p is a parameter to balance the weighting between the score and the surface area.

Refinement

We optionally refine 130 the parameters of the best primitive shape using a gradient-decent procedure. We start the gradient decent from the primitive parameters determined in the RANSAC process. For each gradient decent step, we sample several points $r_k$ ($k=1, \ldots, k$) on the surface of the primitive shape given the current primitive parameters, and use their gradient vectors $\overline{\nabla D}(r_k)$ to determine a Jacobian matrix with respect to each parameter of the primitive shape for refining the parameters.

Subtraction

Given the best primitive, we subtract the points on the primitive from the distance field. We determine the distance between the surface of the primitive shape and each point in the set Z, and if the distance is within a small threshold, we remove the point from Z. We then determine the distance field $D(x)$ by using the new set of points in Z and also update the gradient vector field. The new distance field and gradient vector field are used in the next iteration of our method.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A Method for fitting primitive shapes to a set of three-dimensional (3D) points, comprising the steps of:

Converting the set of 3D points to a distance field, wherein each element in the distance field is associated with a distance to a nearest point in the set of 3D points;

hypothesizing a set of two or more candidates of the primitive shapes;

determining a score for each candidate using the distance field;

selecting the candidate as the primitive shape to fit to the 3D points according to the scores, wherein the steps are performed in a processor;

wherein the distance field $D(x)$ is determined by solving a minimization $$D(x)=\min_{y\in G}(d(x,y)+T(y));$$

where a function d determines a distance between points x and y, T is an indicator function, and $Q=\{q_i^d\}$ is the set of discretized points $$T(y) = \begin{cases} 0 & \text{if } y \in Q \\ \infty & \text{otherwise} \end{cases}.$$

wherein $P=\{p_i\}$, for $i=1, \ldots, N$ is the set of 3D points, where x of the distance field $D(x)$ represents a 3D voxel in a regular volume grid having the size of W×H×L, R is a 3×3 rotation matrix, t is a 3×1 translation vector, s is a scale factor to transform a coordinate system of the set of 3D points to a coordinate system of the distance field, and an $i^{th}$ 3D point $p_i$ is transformed to the coordinate system of the distance field as $q_i=s(Rp_i+t)$, such that all $q_i$ are within the distance field; and wherein $q_i$ are discretized to a nearest grid point of the distance field as $q_i^d=\text{round}(q_i)$, wherein the function round( ) determines the nearest grid point of the 3D point.

2. The method of claim 1, wherein the 3D points are acquired by a 3D sensor.

3. The method of claim 1, further comprising:

fitting a set of primitive shapes by subtracting the selected candidate from the distance field and repeating the converting, hypothesizing, determining, and selecting.

4. The method of claim 1, wherein the primitive shapes are selected from a group consisting of infinite planes plane segments, spheres, cylinders, cuboids, and combinations thereof.

5. The method of claim 1, wherein the score is weighted by a surface area of the primitive shape.

6. The method of claim 1, further comprising:

determining a gradient vector field of the distance field.

7. The method of claim 6, wherein the hypothesizing uses a minimum number of the elements in the distance field required for determining parameters of each candidate.

8. The method of claim 6, wherein each element is an oriented 3D point having a 3D location and a 3D direction vector.

9. The method of claim 6, further comprising:

refining the selected candidate by using a gradient-decent procedure, wherein the gradient-decent procedure uses the gradient vector field.

10. The method of claim 9, further comprising:
determining a Jacobian matrix using the gradient vector field.

\* \* \* \* \*